United States Patent
Earl et al.

(10) Patent No.: US 12,212,214 B2
(45) Date of Patent: Jan. 28, 2025

(54) HYDROGEN APPLICATIONS FOR TURBOEXPANDER MACHINES

(71) Applicant: Sapphire Technologies, Inc., Cerritos, CA (US)

(72) Inventors: Jeffrey Earl, Hermosa Beach, CA (US); Freddie Sarhan, Anaheim, CA (US); Jeremy Liu, Norwalk, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 215 days.

(21) Appl. No.: 17/957,971

(22) Filed: Sep. 30, 2022

(65) Prior Publication Data
US 2024/0113594 A1    Apr. 4, 2024

(51) Int. Cl.
*H02K 7/18*     (2006.01)
*F01D 15/10*    (2006.01)
*H02P 9/04*     (2006.01)

(52) U.S. Cl.
CPC ........... *H02K 7/1823* (2013.01); *F01D 15/10* (2013.01); *H02P 9/04* (2013.01); *F05D 2210/12* (2013.01); *F05D 2220/74* (2013.01); *F05D 2220/75* (2013.01); *F05D 2220/7642* (2013.01); *F05D 2270/061* (2013.01)

(58) Field of Classification Search
CPC ......... H02K 7/1823; F01D 15/10; H02P 9/04; F05D 2210/12; F05D 2220/74; F05D 2220/75; F05D 2220/7642; F05D 2270/061; F05D 2220/40; F05D 2220/60; F05D 2220/76; F02C 1/02; F02C 3/22
See application file for complete search history.

(56) References Cited

U.S. PATENT DOCUMENTS

| | | |
|---|---|---|
| 4,353,214 A | 10/1982 | Gardner |
| 7,638,892 B2 | 12/2009 | Myers |
| 8,146,360 B2 | 4/2012 | Myers et al. |
| 8,384,232 B2 | 2/2013 | Myers et al. |
| 8,739,538 B2 | 6/2014 | Myers et al. |
| 8,839,622 B2 | 9/2014 | Myers et al. |
| 2010/0018203 A1 | 1/2010 | Richards |
| 2012/0013125 A1 | 1/2012 | Myers et al. |

(Continued)

OTHER PUBLICATIONS

International Search Report and Written Opinion in International Appln. No. PCT/US2023/033848, mailed on Feb. 2, 2024, 13 pages.

*Primary Examiner* — Joseph Ortega
(74) *Attorney, Agent, or Firm* — Fish & Richardson P.C.

(57) ABSTRACT

An apparatus includes an electric generator that includes a fluid inlet configured to receive hydrogen at a first pressure, a turbine wheel configured to expand the hydrogen and rotate in response to expansion of the hydrogen flowing into an inlet of the turbine wheel and out of the outlet of the turbine wheel, a rotor coupled to the turbine wheel and configured to rotate with the turbine wheel, a stationary stator, the electric generator to generate an alternating current upon rotation of the rotor within the stator, and a fluid outlet configured to output hydrogen at a second pressure less than the first pressure. The apparatus includes a power electronics system electrically connected to an electrical output of the electric generator and to receive alternating current from the electric generator. The power electronics can condition the generated electrical current to supply power to various types of loads.

19 Claims, 12 Drawing Sheets

(56) References Cited

U.S. PATENT DOCUMENTS

| | | | |
|---|---|---|---|
| 2013/0286591 A1 | 10/2013 | Myers et al. | |
| 2015/0068246 A1 | 3/2015 | Hakamade et al. | |
| 2016/0365590 A1* | 12/2016 | Zheng | H01M 8/0612 |
| 2021/0340908 A1 | 11/2021 | Boucher et al. | |
| 2024/0060425 A1* | 2/2024 | Simonetti | F02K 5/00 |

\* cited by examiner

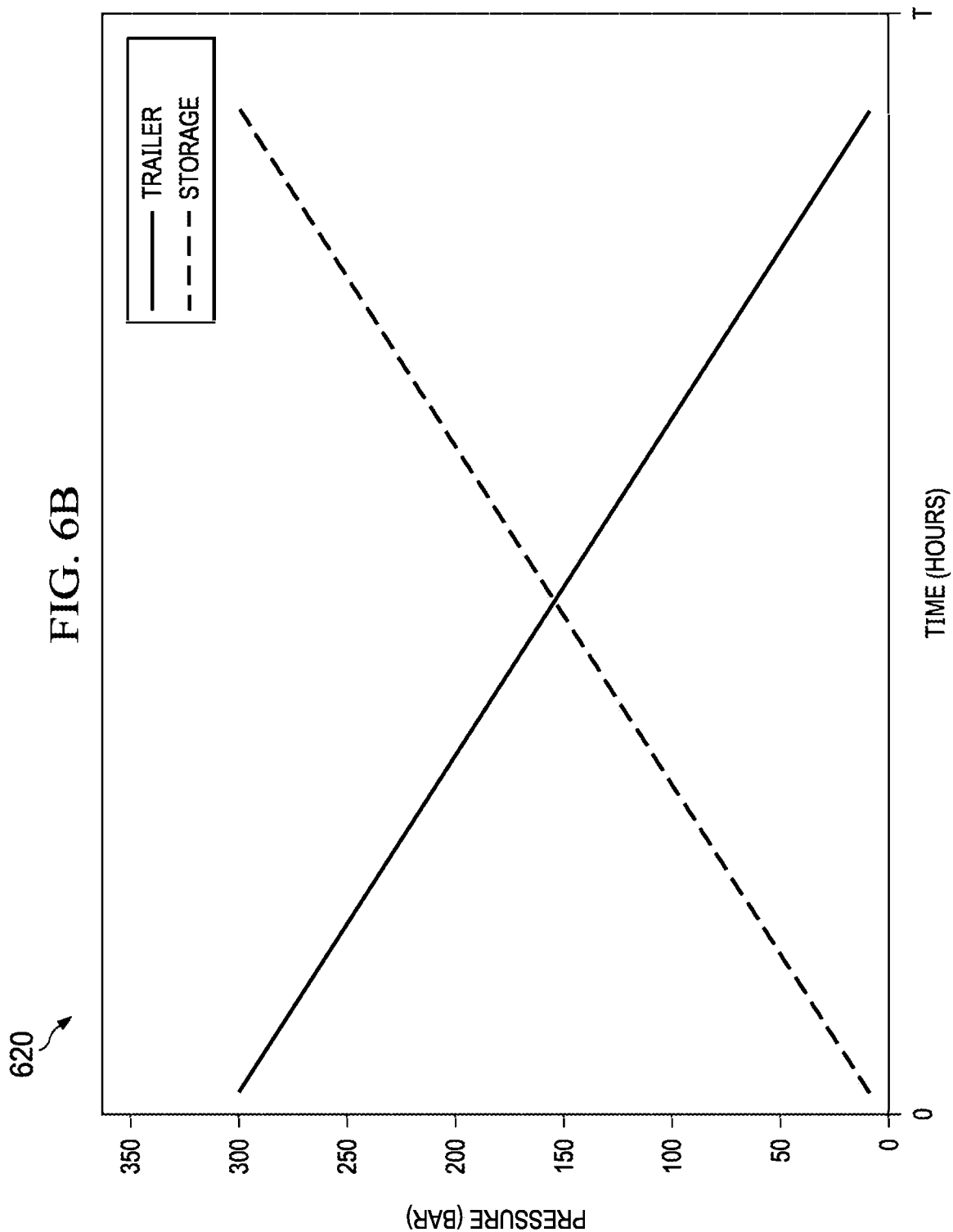

HYDROGEN APPLICATIONS FOR TURBOEXPANDER MACHINES

BACKGROUND

The efficient and effective movement of gases from producing regions to consumption regions uses an extensive and elaborate transportation system. Gases transported via pipelines can be pressurized and can traverse long distances through pipelines at high pressures. For example, hydrogen is a rapidly expanding global energy storage market. Hydrogen is used in many manufacturing processes from petroleum refining to food processing. Hydrogen is also used as a fuel source for gas turbines and in a broad range of fuels cells to generate electricity in industrial and consumer transportation sectors. Other gases can also be transported through pipelines at high pressures, including propane, oxygen, carbon dioxide, and others.

SUMMARY

Aspects of the embodiments are directed to an apparatus that includes an electric generator that includes a fluid inlet configured to receive hydrogen at a first pressure, a turbine wheel configured to expand the hydrogen and rotate in response to expansion of the hydrogen flowing into an inlet of the turbine wheel and out of the outlet of the turbine wheel, a rotor coupled to the turbine wheel and configured to rotate with the turbine wheel, a stationary stator, the electric generator to generate an alternating current upon rotation of the rotor within the stator, and a fluid outlet configured to output hydrogen at a second pressure less than the first pressure. The apparatus also includes a power electronics system electrically connected to an electrical output of the electric generator and to receive alternating current from the electric generator.

In some embodiments, the fluid outlet is coupled to a fuel cell inlet of a fuel cell, and the fluid outlet configured to direct the hydrogen gas at the second pressure to the fuel cell.

In some embodiments, the power electronics is electrically coupled to the fuel cell, and wherein the power electronics is configured to condition the alternating current to have a frequency and amplitude compatible to power the fuel cell.

In some embodiments, fluid outlet is coupled to a gas turbine inlet of a gas turbine, and the fluid outlet configured to direct the hydrogen gas at the second pressure to the gas turbine.

In some embodiments, the fluid inlet is configured to receive hydrogen gas at the first pressure from a trailer container; and the fluid outlet is configured to output hydrogen gas at the second pressure to a compressor of a hydrogen gas storage facility.

In some embodiments, the power electronics is electrically coupled to the compressor, and wherein the power electronics is configured to condition the alternating current to have a frequency and amplitude compatible to power the compressor.

In some embodiments, the fluid inlet is configured to receive cooled heat exchange fluid at the first pressure from a first heat exchanger device hydrogen liquefaction system; and the fluid outlet is configured to output expanded heat exchange fluid at the second pressure to a second heat exchanger of the hydrogen liquefaction system.

In some embodiments, the power electronics is electrically coupled to one or more compressors of the first or second heat exchanger, and wherein the power electronics is configured to condition the alternating current to have a frequency and amplitude compatible to power the one or more compressors.

In some embodiments, the power electronics is electrically coupled to one or more compressors of a pre-cooling heat exchanger of the liquefaction system, and wherein the power electronics is configured to condition the alternating current to have a frequency and amplitude compatible to power the one or more compressors.

In some embodiments, the power electronics comprises a variable speed drive connected to the electrical output of the electric generator, the variable speed drive to convert the alternating current received from the electric generator into an alternating current compatible with a power grid.

In some embodiments, the variable speed drive includes a rectifier to receive alternating current from the electric generator and convert the alternating current into direct current; and an inverter to receive direct current from the rectifier and convert the direct current into an alternating current comprising an amplitude and frequency compatible with the power grid.

In some embodiments, the electric generator comprises a three-phase permanent magnet synchronous generator. In some embodiments, the electric generator comprises a three-phase electrical output, and wherein the brake resistor assembly comprises a brake resistor in series with each phase of the electrical output.

Aspects of the embodiments include a method that involves receiving hydrogen gas at a first pressure into a turbine wheel of an electric generator, the hydrogen gas being received at a first pressure into the turbine wheel causing the turbine wheel to rotate and causing the hydrogen gas to expand; causing a rotor to rotate within a stator of the electric generator by rotation of the turbine wheel; generating electrical current by the electric generator by rotation of the rotor within the stator; directing electrical current generated by the electric generator to a power electronics; and outputting hydrogen gas at a second pressure, the second pressure less than the first pressure.

Some embodiments include outputting the hydrogen gas at the second pressure to a fuel cell.

Some embodiments include conditioning, by the power electronics, the electrical current to be compatible with powering the fuel cell; and directing the conditioned electrical current to the fuel cell.

Some embodiments include receiving the hydrogen gas at the first pressure from a trailer container; and outputting the hydrogen gas at the second pressure to a compressor at a hydrogen gas storage facility.

Some embodiments include conditioning, by the power electronics, the electrical current to be compatible with powering the compressor.

Some embodiments include receiving cooled heat exchanger fluid at the first pressure from a first heat exchanger of a hydrogen liquefaction system; and outputting expanded heat exchanger fluid at the second pressure to a second heat exchanger the hydrogen liquefaction system.

Some embodiments include conditioning, using power electronics, the electrical current to have a frequency and amplitude compatible to power one or more compressors of the hydrogen liquefaction system.

BRIEF DESCRIPTION OF THE DRAWINGS

FIG. 6B is a graphical representation of hydrogen pressure changes in a hydrogen trailer container and a hydrogen storage system in accordance with embodiments of the present disclosure.

Like reference symbols in the various drawings indicate like elements. Drawings not to scale.

DETAILED DESCRIPTION

The turboexpander described herein can be used for various hydrogen applications. The turboexpander can process high pressure hydrogen and convert the pressure energy into electricity for a variety of uses. Applications where the turboexpander can be implemented include: pipeline distribution pressure let down, hydrogen production, hydrogen fuel gas for gas turbines or combustion engines, hydrogen dispensing from trailers, and hydrogen liquefaction. Each of these applications provides a sufficient pressure drop and flow to operate and produce energy using the turboexpander described herein.

The power grid that the turboexpander can supply power to (and draw power from) can be a national or regional power grid, a local power grid for a city or district, or a small grid, local grid, or microgrid, such as an on-site grid that supplies power to a building, campus, industrial manufacturing or processing plant, or neighborhood.

Figure 1:
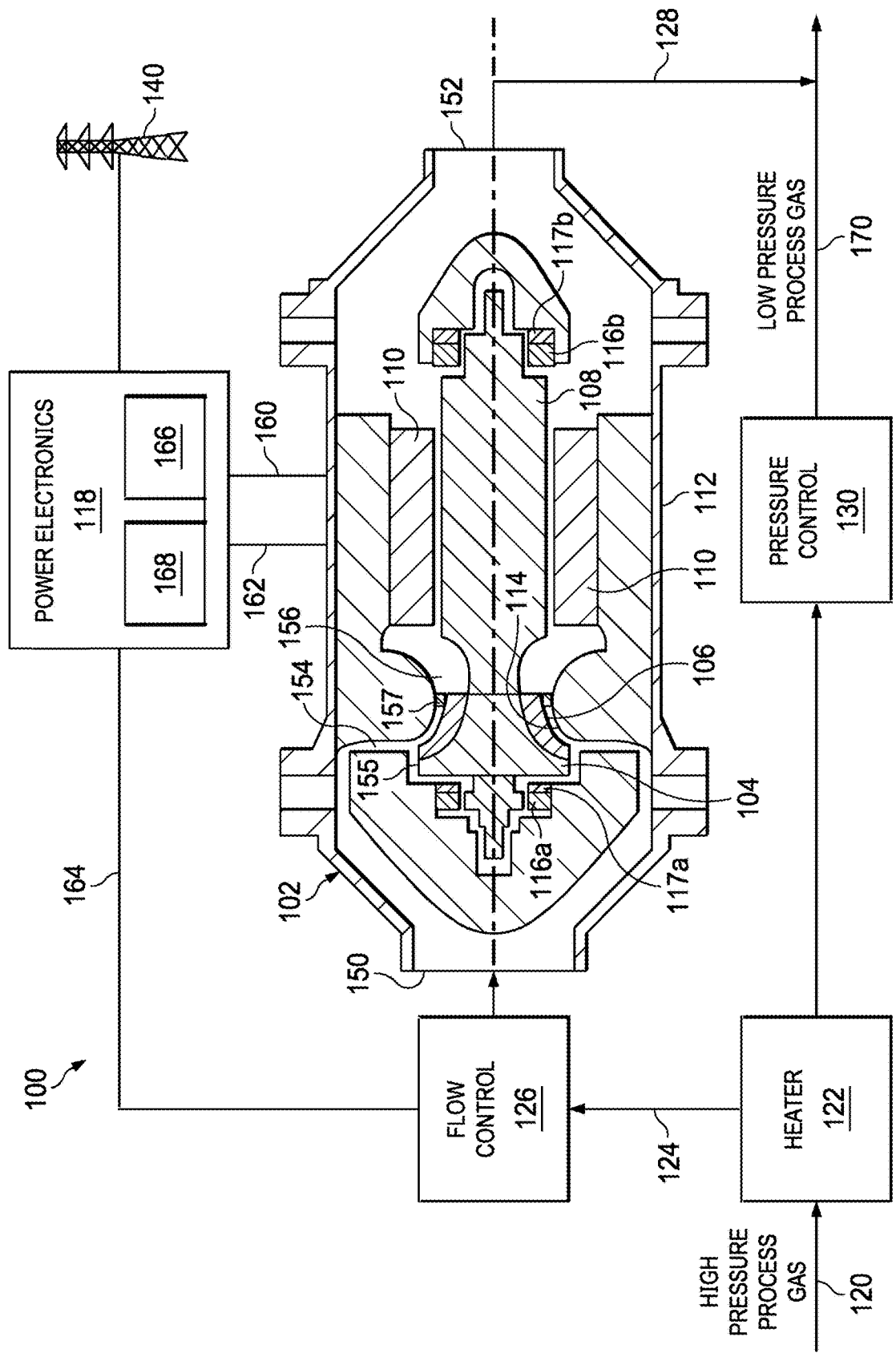
FIG. 1 is a schematic diagram of an electric power generation system coupled to a power grid in accordance with embodiments of the present disclosure.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process, or in any of the other applications described above. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

The turboexpander 102 is shown to have the process gas flow through the system, which cools the generator section and eliminates the need for auxiliary cooling equipment. In some embodiments, non-flow-through overhung systems can also be implemented. The power electronics 118 for turboexpander combines a Variable Speed Drive (VSD) 166 and Magnetic Bearing Controller (MBC) 168 into one cabinet, in some implementations. The VSD allows for a consistent and clean delivery of generated power from the turboexpander 102 to a power grid 140. The VSD 166 regulates the frequency and amplitude of the generated current to match the local grid. After expansion, the gas exits the turboexpander 102 along the same axial path for downstream processes.

The turboexpander 102 is shown as having a flow-through configuration. The flow-through configuration permits process gas to flow from an inlet side of the turboexpander 102 to an outlet side of the turboexpander 102. The gas flows into a radial gas inlet 154 to a turbine wheel 104 and an axial gas outlet 156 from the turbine wheel 104. The gas then flow through the generator and out of the outlet 156, where the gas rejoins the gas pipeline 170. Generally, high pressure process gas 120 is directed to flow into the turboexpander 102 through a flow control system 126. The flow control system 126 includes a flow or mass control valve and an emergency shut off valve. Flow control system 126 can be controlled electrically from power electronics 118 by control line 164. In embodiments, the turboexpander housing 112 is hermetically sealed. As mentioned above, the turboexpander can be non-flow-through and overhung without deviating from the scope of this disclosure. The high pressure process gas 120 is expanded by flowing through the turbine wheel 104, resulting in a pressure letdown of the process gas. Lower pressure process gas 128 exits the turboexpander. The expansion of the high pressure process gas 120 through the turbine wheel 104 causes the turbine wheel 104 to rotate, which causes the rotor 108 to rotate. The rotation of the rotor 108 within the stator 110 generates electrical energy. The turboexpander 102 achieves the desired pressure letdown and captures the energy from the pressure letdown to generate electricity. A pressure control valve 130, such as a conventional pressure regulator, can be installed in parallel to the turboexpander 102. The pressure control valve 130 can be used to control the pressure of the high pressure process gas 120 that flows through the turboexpander. Any excess high pressure process gas that is not directed into the turboexpander can be directed through the pressure control valve 130. In addition, upon deactivation of the turboexpander 102, flow control system 126 can shut off process gas flow to the turboexpander. In that case, the pressure control valve 130 can be set to perform the pressure let-down for the high-pressure gas for downstream distribution and consumption.

The flow control system 126 can include a pressure relief valve, flow control valve, an emergency shut-off valve, etc. The flow control system 126 can use one or more valves to control the pressure of the hydrogen entering the turbine wheel 104 to achieve both a desired turbine wheel speed (and resulting electrical output) and a desired hydrogen output pressure from the turboexpander 102.

In some embodiments, a heater 122 can heat the high pressure process gas 120 prior to flowing the gas into the turboexpander 102. For example, if the expansion of the gas through the turbine wheel 104 lowers the temperature of the process gas to a point where moisture in the gas freezes at the turbine wheel or other downstream locations in the pipeline, the pressurized process gas 120 can be heated by heater 122. (Heated) high pressure process gas 124 can then be directed into the turboexpander 102. The heating of the process gas can prevent freezing moisture as the gas expands and its temperature drops.

The turboexpander 102 includes a turbine wheel 104. The turbine wheel 104 is shown as a radial inflow turbine wheel, though other configurations are within the scope of this disclosure, such as axial flow turbine wheels. In this example, heated high pressure process gas 124 is received from an inlet conduit 150 of the housing 112 enters a radially oriented inlet 154 of the turbine wheel 104. In certain embodiments, the fluid flows through an inlet conduit 150 and is diverted by a flow diverter to a radial inlet 154 that directs the flow into the radial inflow of the turbine wheel 104. After expanding, the lower pressure process gas exits the turbine wheel 104 from an axially oriented outlet 156 to outlet conduit 152 of the housing 112.

The turbine wheel 104 can be directly affixed to the rotor 108, or to an intermediate common shaft, for example, by fasteners, rigid drive shaft, welding, or other manner. For example, the turbine wheel 104 may be received at an end of the rotor 108, and held to the rotor 108 with a shaft. The shaft threads into the rotor 108 at one end, and at the other, captures the turbine wheel 104 between the end of rotor 108 and a nut threadingly received on the shaft. The turbine wheel 104 and rotor 108 can be coupled without a gearbox and rotate at the same speed. In other instances, the turbine wheel 104 can be indirectly coupled to the rotor 108, for example, by a gear train, clutch mechanism, or other manner.

The turbine wheel 104 includes a plurality of turbine wheel blades 106 extending outwardly from a hub and that react with the expanding process gas to cause the turbine wheel 104 to rotate. FIG. 1 shows an unshrouded turbine wheel, in which each of the turbine blades 106 has an exposed, generally radially oriented blade tip extending between the radial inlet 154 and axial outlet 156. As discussed in more detail below, the blade tips substantially seal against a shroud 114 on the interior of the housing 112. In certain instances, the turbine wheel 104 is a shrouded turbine wheel.

In configurations with an un-shrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process gas there between, as the process gas flows through the turbine wheel 104. Although some amount of the process gas may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turbine generator may be optimized to reduce the leakage. In embodiments, the housing 112 is hermetically sealed to prevent process gases from escaping the radial inlet 154 of the turbine wheel 104.

The shroud 114 may reside at a specified distance away from the turbine wheel blades 106, and is maintained at a distance away from the turbine wheel blades 106 during operation of the turboexpander 102 by using magnetic positioning devices, including active magnetic bearings and position sensors.

The turboexpander 102 can include a high-performance, high-speed permanent magnet generator. In certain embodiments, the turboexpander 102 includes a radial in-flow expansion turbine wheel 104. Turboexpander 102 can also include low loss active magnetic bearings (AMBs) 116*a,b*. The rotor assembly can include permanent magnet section with the turbine wheel 104 mounted directly to the rotor hub. The rotor 108 can be levitated by the magnetic bearing system creating a frictionless (or near frictionless) interface between dynamic and static components. The AMBs 116*a,b* facilitate a lossless (or near lossless) rotation of the rotor 108.

Bearings 116*a* and 116*b* are arranged to rotatably support the rotor 108 and turbine wheel 104 relative to the stator 110 and the shroud 114. The turbine wheel 104 is supported in a non-cantilevered manner by the bearings 116*a* and 116*b*. In embodiments, the turbine wheel 104 may be supported in a cantilevered manner and bearings 116*a* and 116*b* may be located on the outlet side of turbine wheel 104. In certain instances, one or more of the bearings 116*a* or 116*b* can include ball bearings, needle bearings, magnetic bearings, foil bearings, journal bearings, or others.

Bearings 116*a* and 116*b* may be a combination radial and thrust bearing, supporting the rotor 108 in radial and axial directions. Other configurations could be utilized. The bearings 116*a* and 116*b* need not be the same types of bearings.

In the embodiments in which the bearings 116*a* and 116*b* are magnetic bearings, a magnetic bearing controller (MBC) 168 is used to control the magnetic bearings 116*a* and 116*b*. Position sensors 117*a*, 117*b* can be used to detect the position or changes in the position of the turbine wheel 104 and/or rotor 108 relative to the housing 112 or other reference point (such as a predetermined value). Position sensors 117*a*, 117*b* can detect axial and/or radial displacement. The magnetic bearing 116*a* and/or 116*b* can respond to the information from the position sensors 117*a*, 117*b* and adjust for the detected displacement, if necessary. The MBC 168 may receive information from the position sensor(s) 117*a*, 117*b* and process that information to provide control signals to the magnetic bearings 116*a*, 116*b*. MBC 168 can communicate with the various components of the turboexpander 102 across a communications channel 162.

The use of magnetic bearings 116*a*, 116*b* and position sensors 117*a*, 117*b* to maintain and/or adjust the position of the turbine wheel blades 106 such that the turbine wheel blades 106 stay in close proximity to the shroud 114 permits the turboexpander 102 to operate at high efficiencies. The use of the active magnetic bearings 116a,b in the turboexpander 102 eliminates physical contact between rotating and stationary components, as well as eliminate lubrication and lubrication systems. In some embodiments, brush seals can be used to prevent gas leakage. The magnetic bearings 116a,b and position sensors 117a,b allow for the rotor to stay in close proximity to the brush seals 157.

The turboexpander 102 may include one or more backup bearings. For example, at start-up and shut-down or in the event of a power outage that affects the operation of the magnetic bearings 116a and 116b, bearings may be used to rotatably support the rotor 108 during that period of time. The backup bearings and may include ball bearings, needle bearings, journal bearings, or the like. As mentioned previously, the turboexpander 102 is configured to generate electricity in response to the rotation of the rotor 108. In certain instances, the rotor 108 can include one or more permanent magnets. The stator 110 includes a plurality of conductive coils. Electrical current is generated by the rotation of the magnet within the coils of the stator 110. The rotor 108 and stator 110 can be configured as a synchronous, permanent magnet, multiphase alternating current (AC) generator. The bi-directional electrical connection 160 can include a three-phase output, for example. The bi-directional electrical connection 160 can facilitate conveyance of (e.g., 3 phase) power output from the generator and can also supply power to the generator for start-up (e.g., to cause the rotor to begin rotating while process gas or other working fluid pressure builds up and can spin the rotor 108 and turbine wheel 104). In certain instances, stator 110 may include a plurality of coils (e.g., three or six coils for a three-phase AC output). When the rotor 108 is rotated, a voltage is induced in the stator coil. At any instant, the magnitude of the voltage induced in coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander 102 is configured to generate electricity at that speed. Such a turboexpander 102 is what is referred to as a "high speed" turbine generator. For example, in embodiments, the turboexpander 102 can produce up to 280 kW at a continuous speed of 30,000 rpm. In embodiments, the turboexpander can produce on the order of 350 kW at higher rotational speeds (e.g., on the order of 35,000 rpm).

In some embodiments, the design of the turbine wheel 104, rotor 108, and/or stator 110 can be based on a desired parameter of the output gas from the turboexpander 102. In some embodiments, the design of the turbine nozzle 155 can also be based on a desired parameter of the output gas from the turboexpander 102. For example, the design of the turbine nozzle and turbine wheel can be based on a desired temperature of the gas 128.

The turboexpander 102 can be coupled to a power electronics 118. Power electronics 118 can include a variable speed drive (VSD) 166 (or variable frequency drive) and the magnetic bearing controller (MBC) 168 (discussed above).

The bi-directional electrical connection 160 of the turboexpander 102 is connected to the VSD 166, which can be programmed to specific power requirements. The VSD 166 can include an insulated-gate bipolar transistor (IGBT) rectifier 208 to convert the variable frequency, high voltage output from the turboexpander 102 to a direct current (DC). The rectifier 208 can be a three-phase rectifier for three-phase AC input current. An inverter 210 then converts the DC from the rectifier AC for supplying to the power grid 140. The inverter 210 can convert the DC to 380 VAC-480 VAC at 50 to 60 Hz for delivery to the power grid 140. The specific output of the VSD 166 depends on the power grid and application. Other conversion values are within the scope of this disclosure. The VSD 166 matches its output to the power grid 140 by sampling the grid voltage and frequency, and then changing the output voltage and frequency of the inverter to match the sampled power grid voltage and frequency. In embodiments, rectifier 208 and inverter 210 are bi-directional, so that power from the grid 140 can be supplied to the turboexpander 102. Power from the grid 140 can be used to start rotation of the rotor 108 within the stator 110 during start-up.

The turboexpander 102 is also connected to the MBC 168 in the power electronics 118. The MBC 168 constantly monitors position, current, temperature, and other parameters to ensure that the turboexpander 102 and the active magnetic bearings 116a and 116b are operating as desired. For example, the MBC 168 is coupled to position sensors 117a, 117b to monitor radial and axial position of the turbine wheel 104 and the rotor 108. The MBC 168 can control the magnetic bearings 116a, 116b to selectively change the stiffness and damping characteristics of the magnetic bearings 116a, 116b as a function of spin speed. The MBC 168 can also control synchronous cancellation, including automatic balancing control, adaptive vibration control, adaptive vibration rejection, and unbalance force rejection control.

Pressure let down systems convert kinetic energy from the process flow into shaft power. The turboexpander can support islanding operations. The turboexpander can continue to provide power to a location in the event that a power grid supplying power to that location is interrupted. This disclosure describes components that can facilitate load matching between the shaft power converted from the process gas flow at the pressure letdown station to load demands. In this way, the turboexpander can support microgrid functionality for islanding operations.

The turboexpander 102 described above includes example features that are implementation-specific. Certain features may be changed, added, removed, or redesigned without deviating from the scope of this disclosure. For example, other types of bearings can be used instead of or in addition to AMBs, such as ball bearings, fluid film bearings, etc. Different designs of rotors and stators can be used, such as brushless DC, induction-type, etc. Other types of stator cooling architectures can be used, such as non-flow-through and overhung architectures.

Distribution pipelines contain the highest gas flow rates in the distribution network and therefore offer the highest power potential for turboexpander-based pressure reduction. Both natural gas and hydrogen pressure reduction stations can utilize multiple turboexpander units in parallel to maximize power production (though one turboexpander is shown in the figures). Potential power generation in high-flow applications can yield up to 3 megawatts (MW) of power potential, the equivalent of about 12,000 tons of CO2e emissions offset annually.

Hydrogen is compressed for traversal through a pipeline and the pressure of the hydrogen will be reduced along the pipeline, as hydrogen flows from high pressure to low pressure. During distribution pressure drops (e.g., using pressure letdown (PLD) or pressure reduction stations (PRS)), usable energy can be recovered by the turboexpander 102 to generate clean electricity. Such a topology is illustrated generally by FIG. 1 described above and more specifically by FIG. 2.

Figure 2:
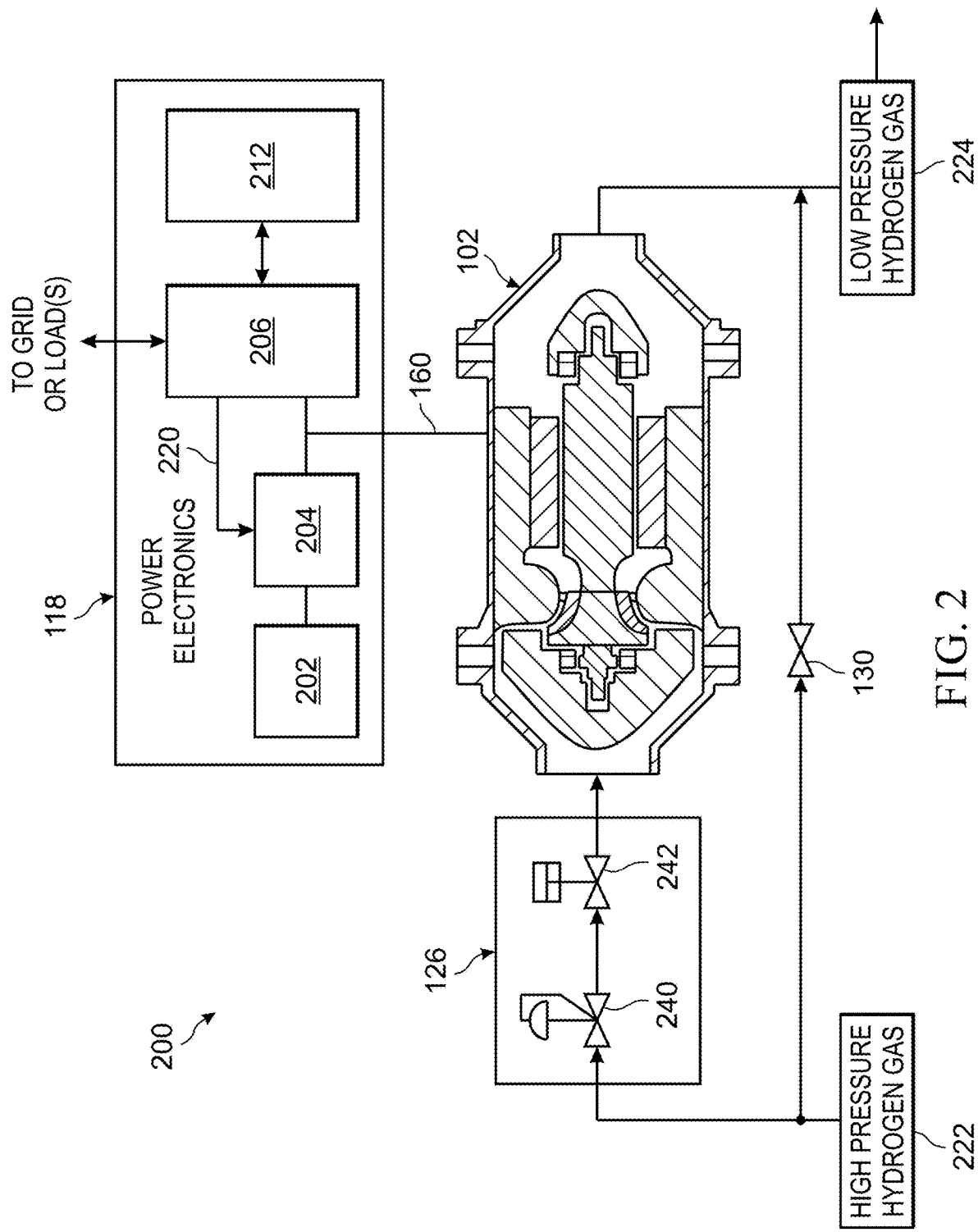
FIG. 2 is a schematic diagram of a hydrogen pressure letdown system that includes a turboexpander in accordance with embodiments of the present disclosure.

FIG. 2 is a schematic diagram of a hydrogen pressure letdown system 200 that includes a turboexpander 102 in accordance with embodiments of the present disclosure. The hydrogen pressure letdown system 200 includes a turboexpander 102 or similar turboexpander. The turboexpander 102 receives high-pressure hydrogen gas 222 from a pipeline, for example, as part of a hydrogen gas pressure letdown process. The high-pressure hydrogen gas can enter a turbine wheel of the turboexpander. The high-pressure hydrogen gas can cause the turbine wheel to rotate, thereby rotating a rotor within a stator. Rotation of the rotor within the stator can generate electrical current. The electrical current can be output from the turboexpander to a power electronics 118. Power electronics 118 can convert the electrical current to be compatible with the grid 140 or other electrical loads. This electricity can be consumed on-site by the facility, consumed on-site in some energy intensive process such as green hydrogen production, or sold to the local energy utility creating a revenue stream for the pipeline owner.

High-pressure hydrogen gas 222 can traverse a pipeline and enter the hydrogen pressure letdown system 200. The hydrogen pressure letdown system 200 includes a flow control system (e.g., flow control system 126 of FIG. 1) and a pressure control valve 130 (also shown in FIG. 1). The flow control system 126 can include a flow control valve (FCV) 240 and an emergency shutoff valve (ESV) 242. FCV 240 can control the pressure of the flow of the high-pressure hydrogen gas 222 that enters the turboexpander 102. The flow rate of the high-pressure hydrogen gas 222 can be controlled by the FCV 240 based on the size of the turbine wheel 104 and the desired power output of power electronics 118; the rotational speed of the rotor 108 can be determined based on the desired rotordynamic performance of the rotor 108. The FCV 240 can be controlled manually or electronically. The FCV 240, for example, can be controlled electronically based on information about the power output in power electronics 118. If the power output is too low, FCV 240 can be adjusted to increase flow rate of high-pressure hydrogen gas 222 input to the turboexpander 102 to increase the torque of rotor 108; conversely, if power output is too high, FCV 240 can be adjusted to decrease flow rate of high-pressure hydrogen gas 222 input to the turboexpander 102 to decrease the torque of rotor 108.

The flow control system 126 can also include ESV 242. ESV 242 can close quickly to prevent high-pressure hydrogen gas 222 from entering the turboexpander 102 during emergency situations. Emergency situations can include rotor over-speed conditions, hydrogen gas leaks, fault conditions at the power electronics 118 or grid 140 or elsewhere (which can cause rotor over-speed), or other emergency situations.

The turboexpander 102 can expand the high-pressure hydrogen gas 222, resulting in low (or lower) pressure hydrogen gas 224. The low-pressure hydrogen gas 224 can be directed to downstream pipelines or elsewhere for distribution. The expansion of the high-pressure hydrogen gas 222 by the turbine wheel 104 of the turboexpander 102 results in the generation of electrical current. The electrical current can be output by the turboexpander 102 through bi-directional electrical connection 160 to power electronics 118. Power electronics 118 can convert the generated electrical current into a form compatible with intended consumers of the electrical current. For example, power electronics 118 can change the amplitude and frequency of the generated electrical current to be compatible with supplying power to grid 140 or to electrical loads.

The power electronics 118 can include a variable speed drive (VSD) 206. VSD 206 can include circuitry that can change electrical current to suit a specific load or the grid. For example, the VSD 206 can include circuitry that can convert the generated electrical current from AC to DC (e.g., a rectifier circuit) and from DC to AC (e.g., inverter circuit). The VSD 206 can include a bi-directional inverter 212 to allow the turboexpander to receive power from the grid for start-up. The VSD 206 can also include circuitry to change the waveform of the generated electrical current to conform the electrical current to have a frequency and amplitude compatible with the power grid 140. Other electrical circuits are also contemplated and are within the scope of this disclosure.

The power electronics 118 can include a brake resistor assembly 202. The brake resistor assembly 202 can be used to oppose run-away current generation during rotor over-speed conditions to slow the rotor rotation speed to prevent damage to the rotor. The brake resistor assembly 202 can be coupled to the bi-directional electrical connection 160 by a contactor 204. Contactor 204 can close the circuit between the turboexpander power output and the brake resistor quickly to protect the rotor based on the detection 220 of an over-speed condition. The brake resistor assembly 202 impedance can be selected (or tuned) based on the power output of the turboexpander. The brake resistor assembly 202 can include a plurality of resistors (and in some cases resistors and capacitors). Though shown as part of the power electronics 118, it is understood that the brake resistor assembly 202 and contactor 204 can be directly connected to the output of the turboexpander 102, to reduce the latency between detecting the fault condition responsible for rotor over-speed and the closing of the contactor 204.

Figure 3:
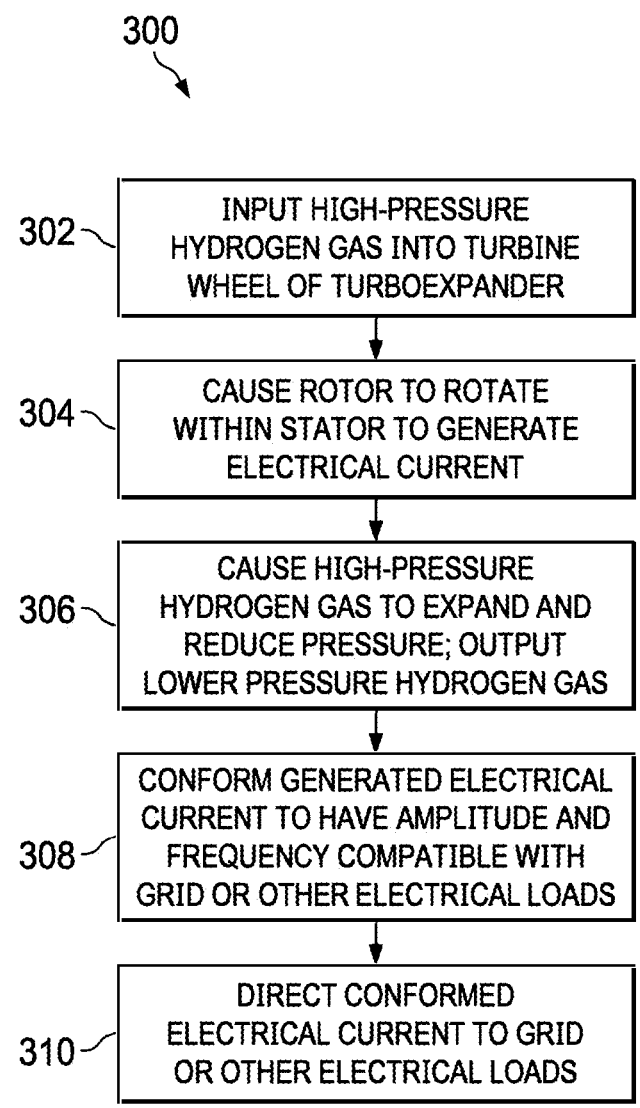
FIG. 3 is a process flow diagram for operating a turboexpander for high-pressure hydrogen gas pressure letdown in accordance with embodiments of the present disclosure.

FIG. 3 is a process flow diagram 300 for operating a turboexpander for high-pressure hydrogen gas pressure letdown in accordance with embodiments of the present disclosure. High-pressure hydrogen gas is input into turbine wheel of turboexpander (302). The high-pressure hydrogen gas input into the turbine wheel can cause the turbine wheel to rotate, which causes a rotor to rotate within a stator (304). The turbine wheel also expands the high-pressure hydrogen gas, thereby lowering the pressure of the hydrogen gas. This low (or lower)-pressure hydrogen gas is output from the turboexpander for downstream distribution and consumption (306).

The electrical current generated by the turboexpander can be output to a power electronics system. The power electronics can adjust the electrical current to be a form compatible with the intended load(s) or for supplying to the grid (308). The power electronics system can output the adjusted electrical current to the intended load(s) or to the grid (310).

It is understood that the order of operations shown in FIG. 3 (or in other process flow figures described herein) can be performed in a different order. Some processes are performed in parallel. For example, the turboexpander will generate electrical current once the turboexpander rotor is rotating at a certain speed with a certain torque. The flow of the hydrogen gas can be continuous, which maintains the desired power output from the power electronics. While the rotor is spinning at the desired speed, the expanded hydrogen gas is output from the turboexpander and directed downstream and the electrical current is output from the power electronics. These processes of generating electrical current by the turboexpander from expansion of high-pressure hydrogen gas can continue until the system is shut down for whatever reason.

The pressure letdown application shown in FIG. 2 can be used in combination with other hydrogen applications. Generally, the turboexpander 102 can be used to expand high-pressure hydrogen gas 222 and output lower pressure hydrogen gas 224 and generate electrical current.

Figure 4:
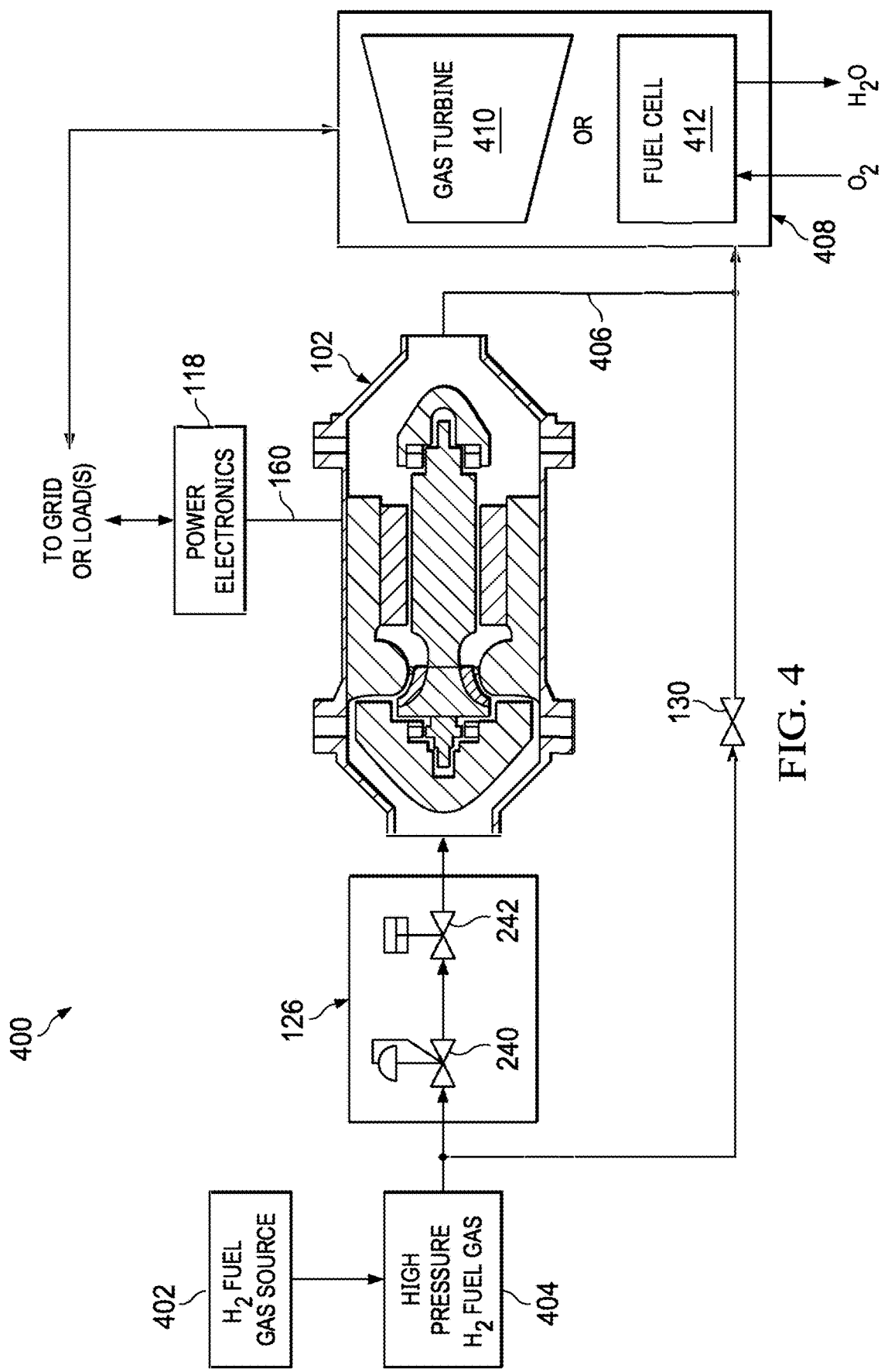
FIG. 4 is a schematic diagram of a hydrogen fuel gas system that includes a turboexpander in accordance with embodiments of the present disclosure.

FIG. 4 is a schematic diagram of a hydrogen-based power station 400 that includes a turboexpander 102 in accordance with embodiments of the present disclosure. Hydrogen is used to generate power in gas turbines (such as gas turbine 410) and fuel cells (such as fuel cell 412). Both applications use large volumes of hydrogen, which can be supplied by on-site storage or by a co-located production facility via pipeline. The pipeline or storage pressure is reduced (or let down) before the hydrogen enters the gas turbine 410 or fuel cell 412. The turboexpander 102 can be used to recover energy from pressure reduction of the hydrogen fuel gas.

In some circumstances, the volumetric flow rate in these applications can be on the order of 1,000 to 5,000 Nm3/h. The potential recoverable power ranges from 10 kW up to 300 kW, which can be enough to improve overall plant efficiency. One example use for the generated power is to offset the electrical demand of the facility. The economic benefit or return on investment can then be evaluated using the retail price of electricity rather than the wholesale price for selling the electricity to the grid.

At the outset, high-pressure hydrogen gas 404 is delivered to the hydrogen-based power station 400 from a hydrogen fuel gas source 402. The hydrogen fuel gas source can include a hydrogen storage tank or a hydrogen pipeline. The hydrogen-based power station 400 includes a flow control system 126 and a pressure control valve 130. As mentioned before, flow control system 126 includes a FCV 240 and ESV 242. Flow control system 126 can control the flow of high-pressure hydrogen fuel gas 404 into the turbine wheel 104 of the turboexpander 102. The turbine wheel 104 of the turboexpander 102 can expand and reduce the pressure of the high-pressure hydrogen fuel gas 404. The low (or lower)-pressure hydrogen fuel gas 406 can be supplied to a hydrogen-based power system 408, such as a gas turbine 410 or fuel cell 412. The hydrogen-based power system 408 can provide power to the grid or to one or more loads.

The energy reclaimed from the pressure letdown of the high-pressure hydrogen fuel gas 404 by the turbine wheel 104 is used to generate electrical current. The expansion of the high-pressure hydrogen fuel gas 404 causes the turbine wheel 104 to rotate, thereby rotating a rotor 108. Rotation of the rotor 108 within the stator 110 generates electrical current. The electrical current can be used to power certain loads, such as those at the power station facility; or the electrical current can be used to supply power to the grid. For example, electrical current generated by the turboexpander 102 can be directed to a power electronics 118 (described above). Power electronics 118 can include circuitry to condition the generated electrical current to be compatible with the load(s) or the grid. The power electronics 118 can also condition the power generated by the turboexpander 102 to have a frequency and amplitude compatible with the gas turbine 410 or the fuel cell 412.

Figure 5:
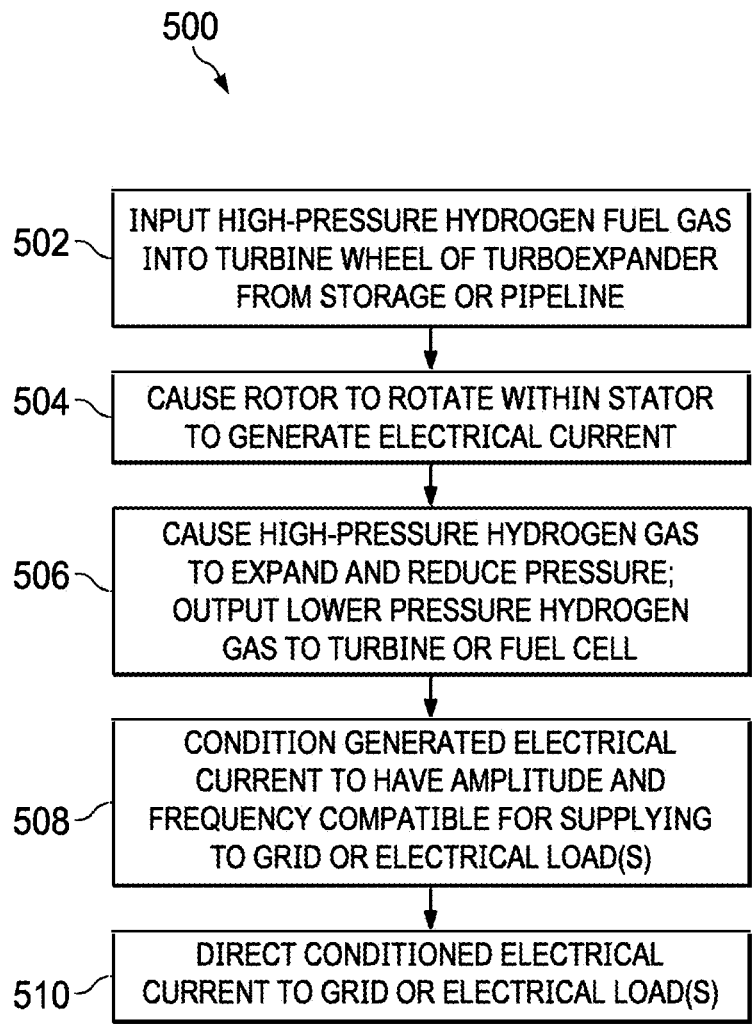
FIG. 5 is a process flow diagram for expanding hydrogen fuel gas using a turboexpander in accordance with embodiments of the present disclosure.

FIG. 5 is a process flow diagram for expanding hydrogen fuel gas using a turboexpander in accordance with embodiments of the present disclosure. High-pressure hydrogen fuel gas is input into turbine wheel of turboexpander (502). The high-pressure hydrogen fuel gas input into the turbine wheel can cause the turbine wheel to rotate, which causes a rotor to rotate within a stator (504). The turbine wheel also expands the high-pressure hydrogen fuel gas, thereby lowering the pressure of the hydrogen fuel gas. This low (or lower)-pressure hydrogen fuel gas is output from the turboexpander for downstream distribution and consumption (506).

The electrical current generated by the turboexpander can be output to a power electronics. The power electronics can condition the electrical current to be compatible with the intended load(s) or for supplying to the grid (508). The power electronics can output the adjusted electrical current to the intended load(s) or to the grid (510).

Figure 6A:
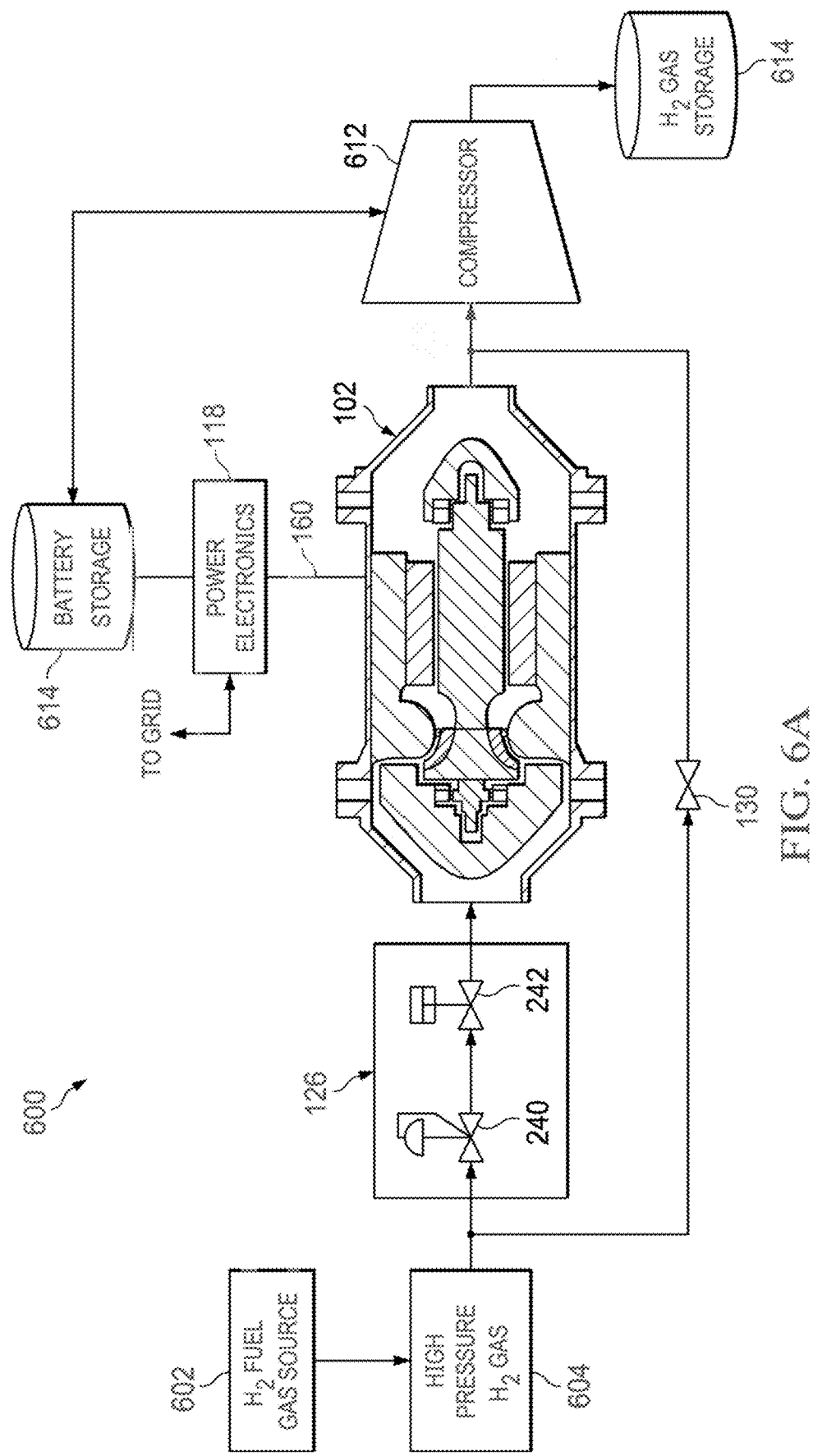
FIG. 6A is a schematic diagram for a hydrogen storage container system that includes a turboexpander in accordance with embodiments of the present disclosure.

FIG. 6A is a schematic diagram for a hydrogen fueling station 600 that includes a turboexpander in accordance with embodiments of the present disclosure. Hydrogen gas can be transported from a starting point to hydrogen fueling station 600 via bulk delivery trailers. Hydrogen gas is offloaded from the hydrogen gas trailer container 602 to onsite storage 614 at the fueling station 600, where the hydrogen gas is stored until it is dispensed to consumers' vehicles. The use of trailers for transporting hydrogen gas is useful while a global hydrogen pipeline infrastructure is being constructed and implemented.

These bulk trailers deliver gaseous hydrogen 604 at high pressure (~700-bar) which is bled into a storage container 614 at the hydrogen fueling station 600. This process includes expansion of high-pressure hydrogen gas 604. In embodiments of this disclosure, turboexpander 102 can be used to control the expansion of the high-pressure hydrogen gas 604 from the trailer container 602 and reclaim energy from the expansion of the high-pressure hydrogen gas to generate electrical current. During the initial portion of the trailer offloading process, when the pressure of the H2 gas trailer 602 is at a pressure higher than that of the H2 Gas storage 614, the turboexpander 102 can be used to recover expansion energy by generating electrical current. This electrical current can be used to offset at least some of the electrical demand required to run compressor 612, which is used to pump hydrogen gas into the hydrogen gas storage container 614 at a latter portion of the emptying process when the pressure of the H2 gas trailer 602 is at a pressure lower than that of the H2 Gas storage 614.

At the outset, high-pressure hydrogen gas 604 is delivered to the hydrogen fuel station 600 by a hydrogen gas trailer 602. The hydrogen fuel station 400 includes a flow control system 126 and a pressure control valve 130. As mentioned before, flow control system 126 includes a FCV 240 and ESV 242. Flow control system 126 can control the flow of high-pressure hydrogen gas 604 into the turbine wheel 104 of the turboexpander 102. The turbine wheel 104 of the turboexpander 102 can expand and reduce the pressure of the high-pressure hydrogen gas 604.

The energy reclaimed from the pressure letdown of the high-pressure hydrogen gas 604 by the turbine wheel 104 is used to generate electrical current. The expansion of the high-pressure hydrogen gas 604 causes the turbine wheel 104 to rotate, thereby rotating a rotor 108. Rotation of the rotor 108 within the stator 110 generates electrical current. The electrical current can be used to power certain loads, such as compressor 612 via a battery storage system 614, or at least offset the power consumed by compressor 612 by selling generated power to the grid or by using the generated power to power other loads at the facility. For example, electrical current generated by the turboexpander 102 can be directed to a power electronics 118 (described above). Power electronics 118 can include circuitry to condition the generated electrical current to be compatible with the battery storage system 614, or other load(s) at the fueling station or the grid.

FIG. 6B is a graphical representation 620 of hydrogen pressure changes in a hydrogen trailer container and a hydrogen storage system in accordance with embodiments of the present disclosure. As the hydrogen pressure in the trailer container falls, a compressor is used to pump the hydrogen into the storage tank. The compressor can be powered by the turboexpander via a battery storage system, as shown in FIG. 6A to fill the storage tank at the fueling station with pressurized hydrogen.

Figure 7:
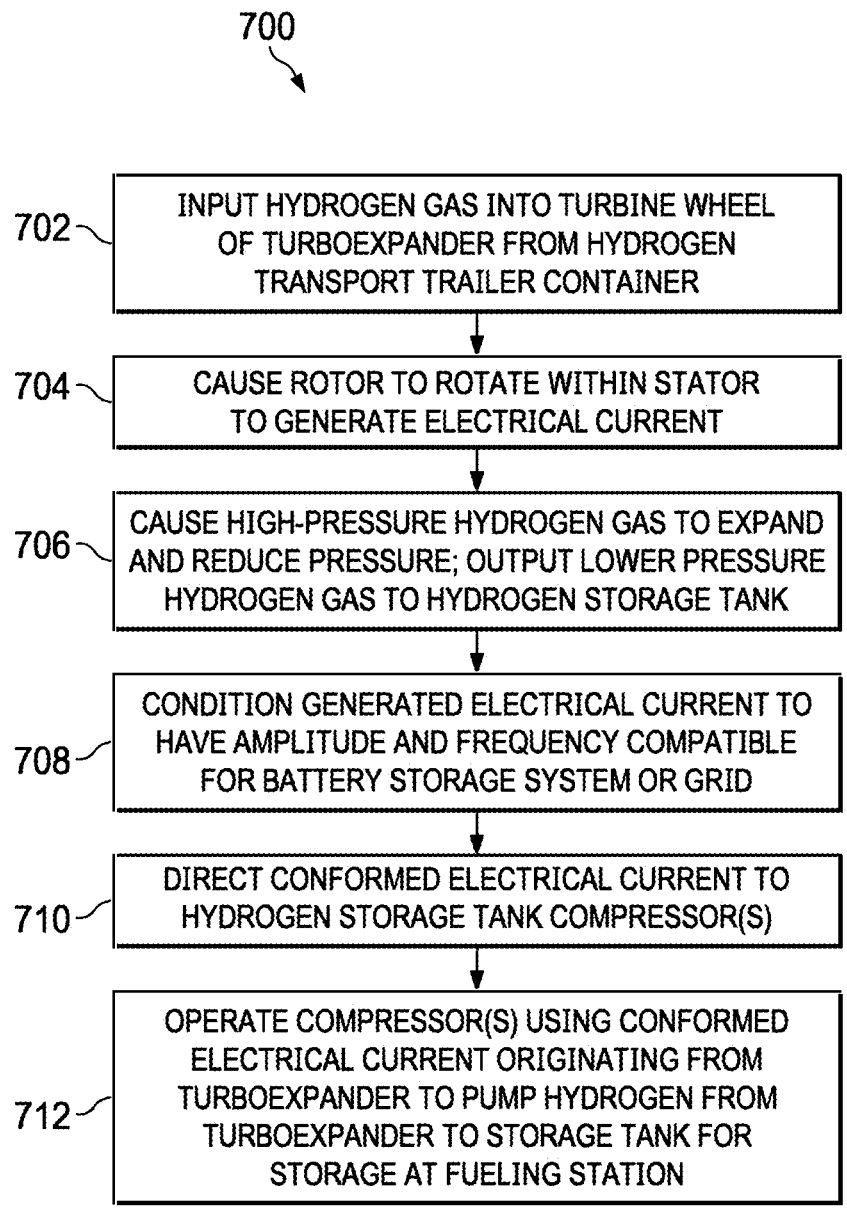
FIG. 7 is a process flow diagram for transferring hydrogen from a trailer container to a storage tank using a turboexpander in accordance with embodiments of the present disclosure.

FIG. 7 is a process flow diagram for transferring hydrogen from a trailer container to a storage tank using a turboexpander in accordance with embodiments of the present disclosure. High-pressure hydrogen gas is input into turbine wheel of turboexpander from the trailer container (702). The high-pressure hydrogen gas input into the turbine wheel can cause the turbine wheel to rotate, which causes a rotor to rotate within a stator (704). The turbine wheel also expands the high-pressure hydrogen gas, thereby lowering the pressure of the hydrogen gas. This low (or lower)-pressure hydrogen gas is output from the turboexpander into a storage container at the fueling station (706).

The electrical current generated by the turboexpander can be output to a power electronics. The power electronics can condition the electrical current to be compatible with a battery storage system, as well as other facility load(s) or for supplying to the grid (708). The power electronics can output the adjusted electrical current to battery storage system or intended load(s) or to the grid (710). The compressor can be operated using the power generated from the expansion of the hydrogen gas to pump the hydrogen gas into the fuel tank (712).

Figure 8:
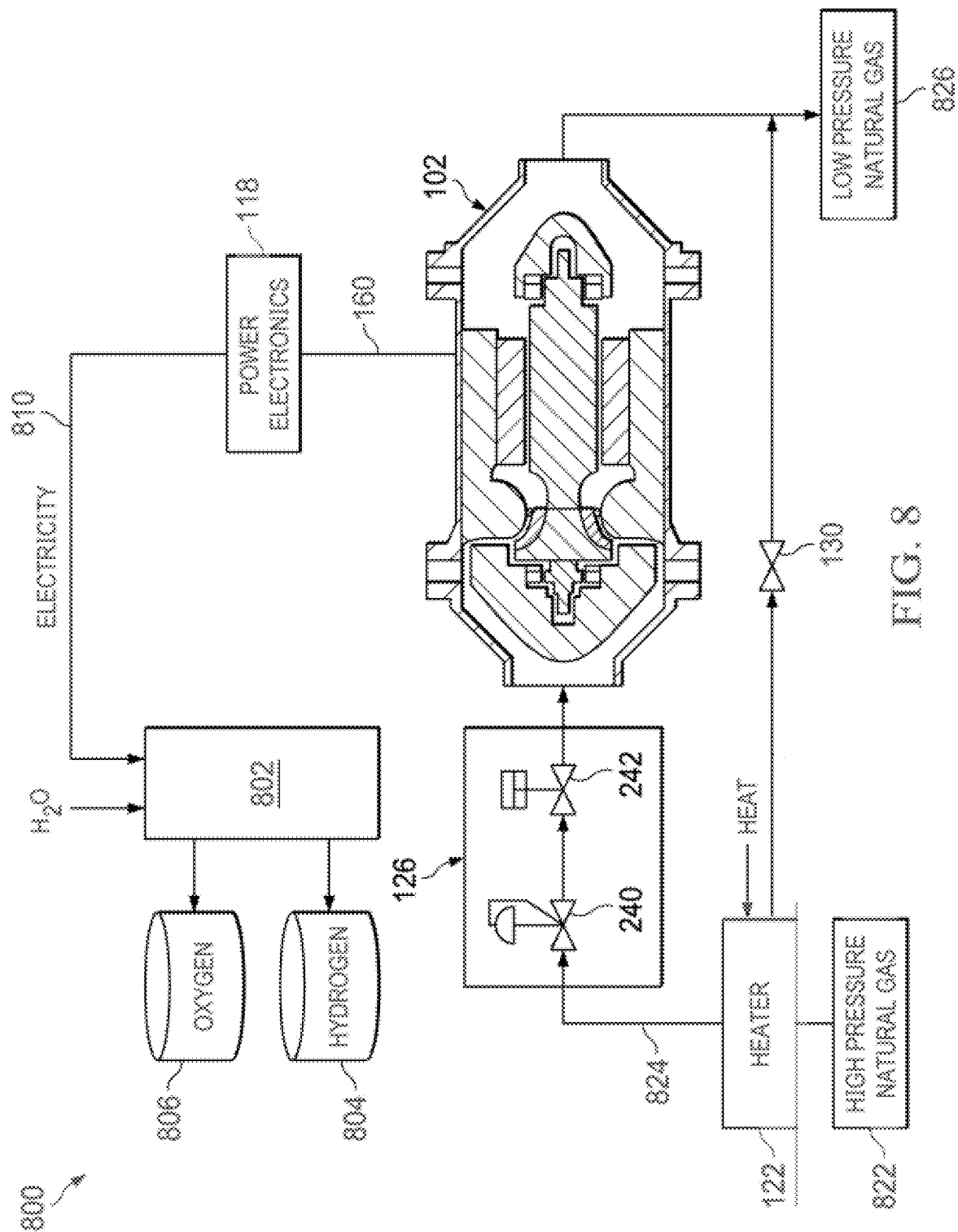
FIG. 8 is a schematic diagram of a hydrogen production system that includes a turboexpander in accordance with embodiments of the present disclosure.

FIG. 8 is a schematic diagram of a hydrogen production system 800 that includes a turboexpander 102 in accordance with embodiments of the present disclosure. The turboexpander 102 can recover energy lost during pressure let down in a natural gas distribution network. Natural gas distribution is an energy intensive process that uses several megawatt class compressors to pressurize the gas and transmit it along thousands of miles of pipeline. At city gate Pressure Reduction Stations (PRS), this compressed pipeline gas is reduced to a pressure suitable for distribution to local businesses, energy production, and residential use.

At PRS, instead of pressure reduction valves or Joule-Thomson (JT) valves, the turboexpander 102 can be used to reduce the pressure. The energy from the expansion of the natural gas can be recovered and converted into useable electricity using the turboexpander 102.

Some PRS are located in remote areas with limited access to the surrounding electrical grid. Therefore, locally consuming the generated power is desirable. In embodiments, the power generated by the turboexpander 102 can be consumed for green hydrogen production through electrolysis. The electricity generated from the turboexpander 102 can power a bank of electrolyzers, which can produce hydrogen and oxygen from water.

Current polymer electrolyte membrane (PEM) electrolyzer efficiencies range from 70 to 82% with the expectation of reaching 86% by 2030 according to the Fuel Cells and Hydrogen Joint Undertaking. Current PEM technology produces about 1 kg of hydrogen per 50 kWh of electricity, thus a 280 kW FIT system producing 2.45 GWh of power per year can produce up to 54 tons of green hydrogen annually. Production of green hydrogen from clean and renewable energy sources will play an integral role in meeting The Paris Agreement goals.

In FIG. 8, the hydrogen production system 800 is linked to a natural gas PRS that links a pipeline that can transport high-pressure natural gas 822. The high-pressure natural gas 822 can be heated using heater 122. The heated, high-pressure natural gas can be directed into the turboexpander 102 through a flow control system 126. The hydrogen production system 800 includes a flow control system 126 and a pressure control valve 130. As mentioned before, flow control system 126 includes a FCV 240 and ESV 242. Flow control system 126 can control the flow of heated, high-pressure natural gas 824 into the turbine wheel 104 of the turboexpander 102. The turbine wheel 104 of the turboexpander 102 can expand and reduce the pressure of the heated, high-pressure natural gas 824. The low (or lower)-pressure natural gas 826 is directed to the pipeline for downstream distribution and consumption.

The energy reclaimed from the pressure letdown of the heated, high-pressure natural gas 824 by the turbine wheel 104 is used to generate electrical current. The expansion of the heated, high-pressure natural gas 824 causes the turbine wheel 104 to rotate, thereby rotating a rotor 108. Rotation of the rotor 108 within the stator 110 generates electrical current. The electrical current can be used to power electrolyzer 802, or at least offset the power consumed by electrolyzer 802 by selling generated power to the grid or by using the generated power to power other loads at the hydrogen production station 800. For example, electrical current generated by the turboexpander 102 can be directed to a power electronics 118 (described above). Power electronics 118 can include circuitry to condition the generated electrical current from the turboexpander to be compatible with the electrolyzer 802, or other load(s) at the hydrogen production system 800 or the grid.

The electrolyzer 802 can use water as an input to produce hydrogen 804 and oxygen 806 through electrolysis. The hydrogen can then be transported offsite by trailer or blended into the natural gas pipeline.

Figure 9:
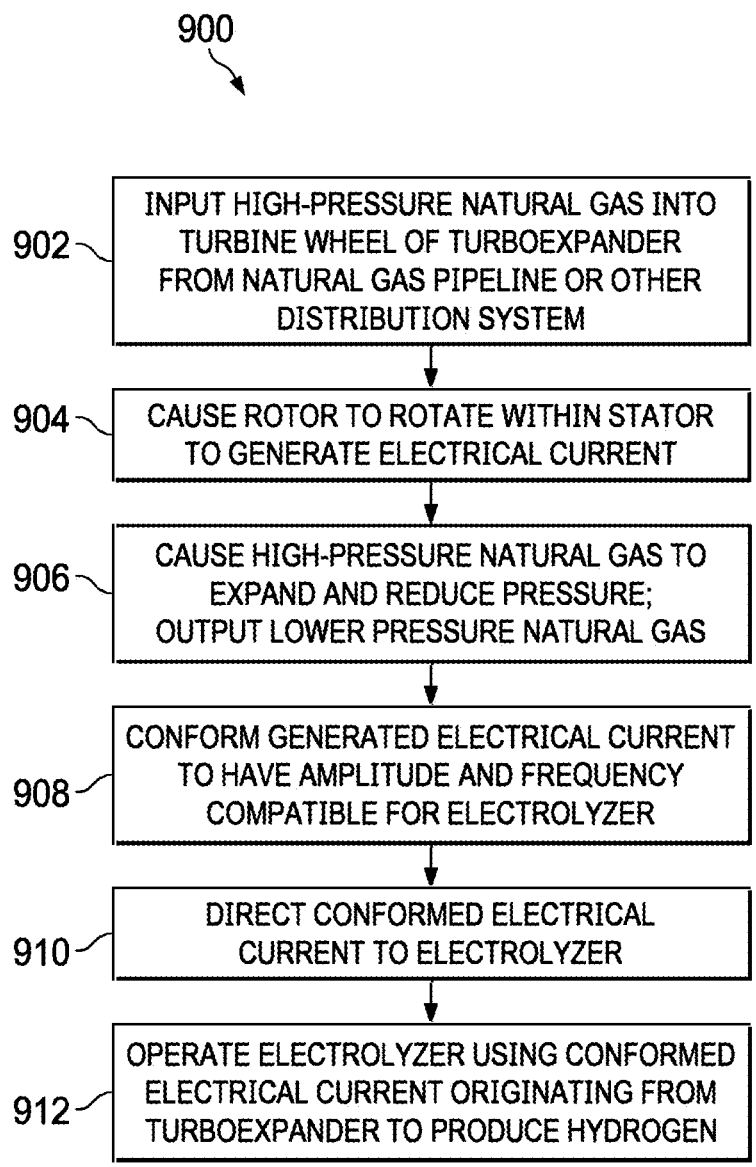
FIG. 9 is a process flow diagram for producing hydrogen using a turboexpander in accordance with embodiments of the present disclosure.

FIG. 9 is a process flow diagram for producing hydrogen using a turboexpander in accordance with embodiments of the present disclosure. High-pressure natural gas is input into turbine wheel of turboexpander from (902). The high-pressure natural gas input into the turbine wheel can cause the turbine wheel to rotate, which causes a rotor to rotate within a stator (904). The turbine wheel also expands the high-pressure natural gas, thereby lowering the pressure of the natural gas. This low (or lower)-pressure natural gas is output from the turboexpander for downstream distribution and consumption (906).

The electrical current generated by the turboexpander can be output to a power electronics. The power electronics can condition the electrical current to be compatible with an electrolyzer for a hydrogen production process system (908). The power electronics can output the adjusted electrical current to power the electrolyzer (910). The electrolyzer can then operate to produce hydrogen, as described in the text accompanying FIG. 8 (912).

Figure 10:
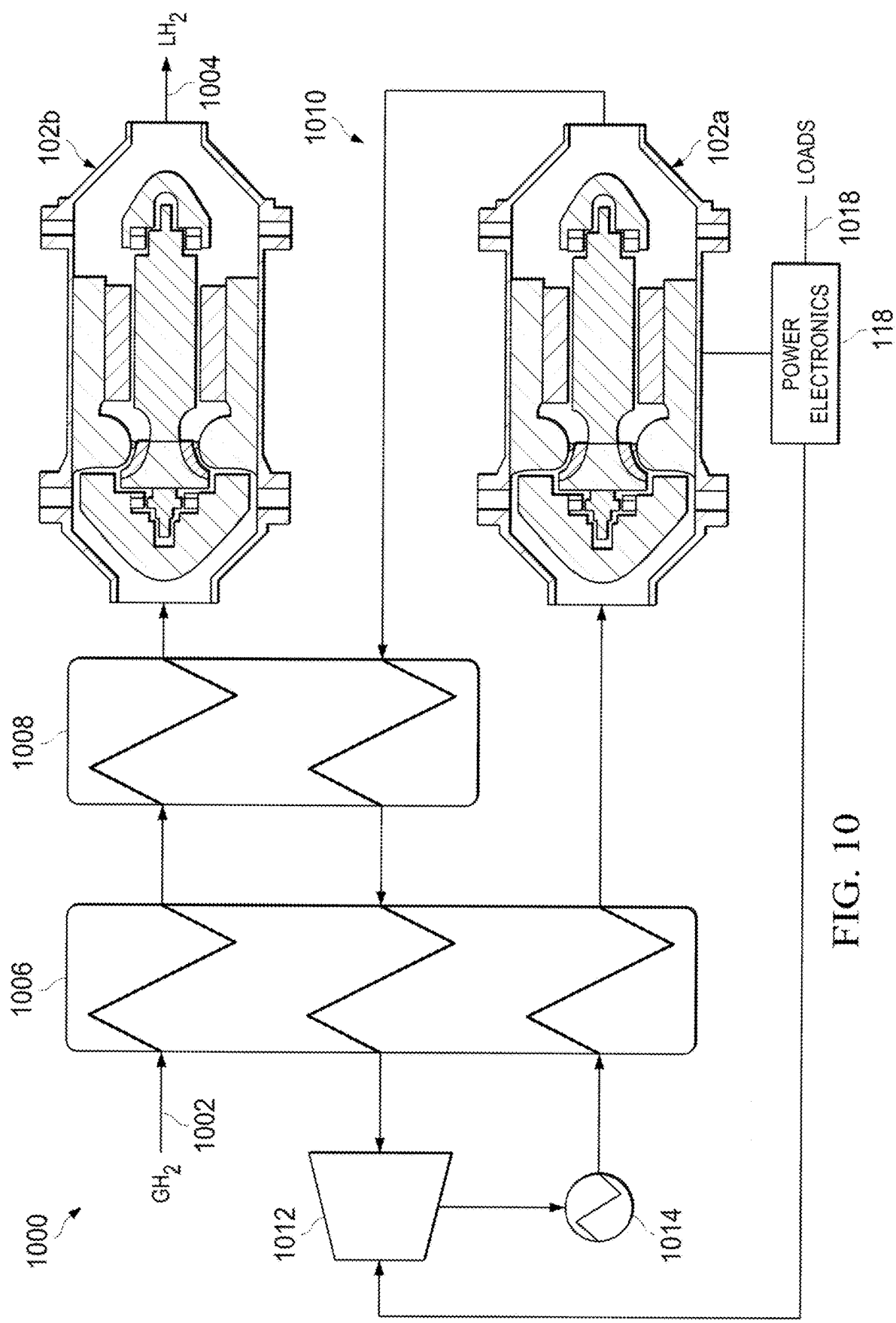
FIG. 10 is a schematic diagram of a hydrogen liquefaction system that includes a turboexpander in accordance with embodiments of the present disclosure.

FIG. 10 is a schematic diagram of a hydrogen liquefaction system 1000 that includes a turboexpander in accordance with embodiments of the present disclosure. Hydrogen, like other gases, is most efficiently transported in its liquid state. The liquefaction process shown in FIG. 10 can be used to convert hydrogen gas ($GH_2$ 1002) into liquid hydrogen ($LH_2$ 1004). A series of processes are used to reduce the temperature of the $GH_2$ 1002 down to −253° C., including compression, heat exchange, and expansion. The turboexpander 102 can be used to recover energy lost during the expansion of H2 and the expansion of the closed-loop heat exchange fluid (such as hydrogen, helium, or nitrogen).

The example liquefaction system 1000 shown in FIG. 10, two heat exchangers (e.g., heat exchanger 1006 and heat exchanger 1008) are used. The heat exchangers drop the temperature from the incoming GH2 1002 and the exiting LH2 1004. There may be more than two heat exchangers (or more than two heat exchange processes). Other equipment may also be included in this portion of the system that are not illustrated, such as compressors or other devices. Heat exchanger can include pre-cooling heat exchanger, cryogenic heat exchangers, etc.

The heat exchange system 100 also includes a closed-loop Brayton cycle 1010. The closed-loop Brayton cycle includes a compressor 1006 for compressing the heat exchange fluid. The compressor 1012 directs the heat exchange fluid into a cooler 1014. The cooled heat exchange fluid can be used in heat exchanger 1006 to cool hydrogen The turboexpander 102a can be used to further expand and cool the heat exchange fluid for use in heat exchanger 1008 and in heat exchanger 1006 to further cool the hydrogen. The heat exchange fluid is then directed into the compressor 1012 to continue the Brayton cycle 1010.

The expansion of the heat exchange fluid by the turbine wheel of the turboexpander 102a can result in the generation of electricity. The power generated by the turboexpander 102a by the expansion of the heat exchange fluid can be used to power loads. Power electronics 118 can condition the electricity output by the turboexpander for use by one or more loads. For example, electricity generated by the turboexpander 102a can be used to power the compressor 1012 (or offset power used by the compressor 1012). The turboexpander 102a can also provide power to other loads 1018. Such loads can include other devices that are part of the liquefaction process, such as compressors in the heat exchangers 1006, 1008 or other devices.

In some embodiments, a turboexpander 102b can also be used to generate electricity from the expansion of the hydrogen in the liquefaction process. Power generated from hydrogen expansion can be used to power compressors or other devices.

Figure 11:
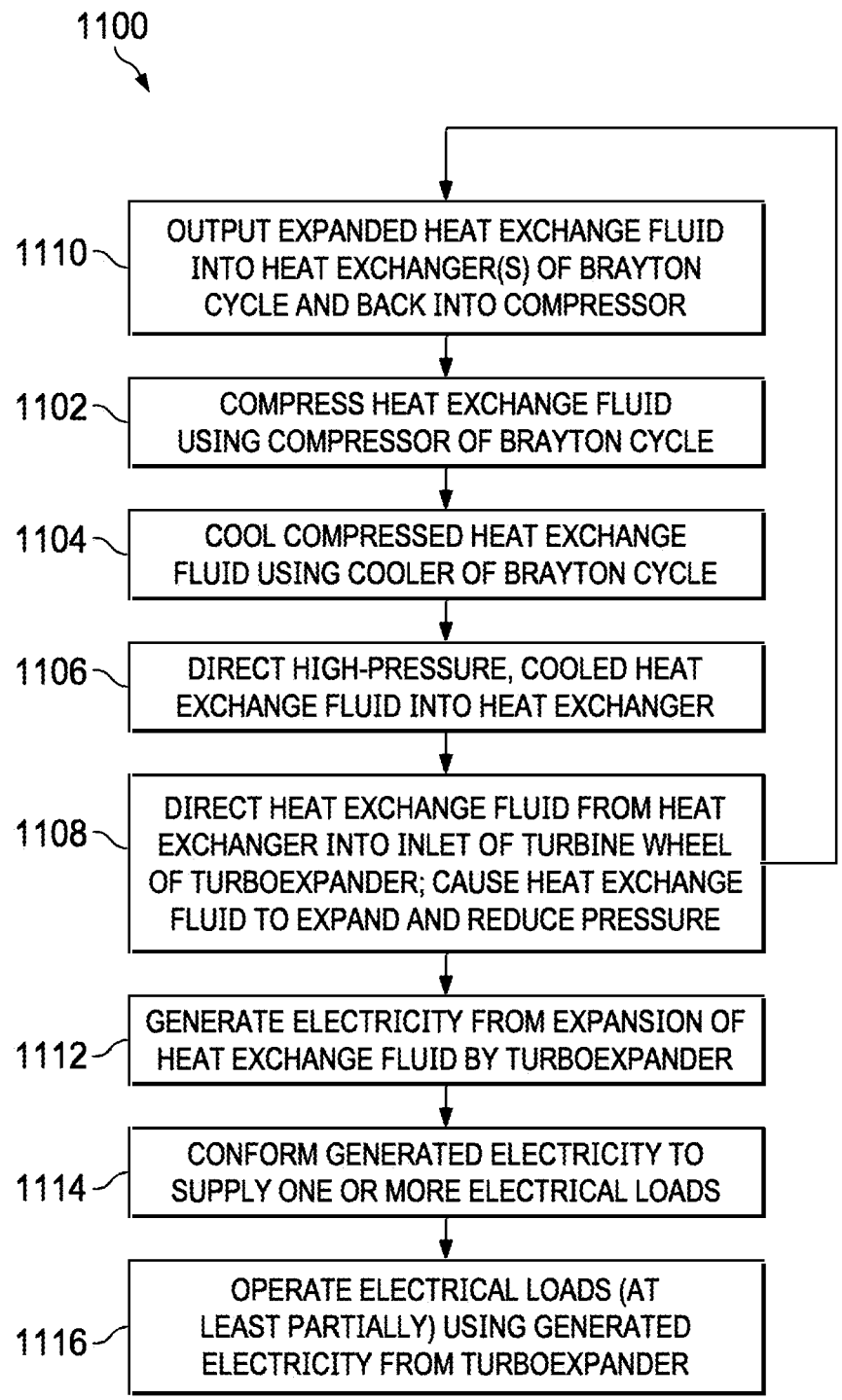
FIG. 11 is a process flow diagram for performing hydrogen liquefaction using a turboexpander in accordance with embodiments of the present disclosure.

FIG. 11 is a process flow diagram for performing hydrogen liquefaction using a turboexpander in accordance with embodiments of the present disclosure. As mentioned above, the liquefaction system includes heat exchangers and a closed-loop Brayton cycle. The Brayton cycle can include a compressor that compresses heat exchange fluid (1102). The compressed heat exchange fluid can be cooled by a cooling device (1104). The pressurized and cooled heat exchange fluid can be used in a heat exchanger of the hydrogen liquefaction process (1106). The heat exchange fluid can be expanded by a turbine wheel of a turboexpander (1108). The expansion of the heat exchange fluid by the turbine wheel of the turboexpander reduces the pressure of the heat exchange fluid and causes a rotor coupled to the turbine wheel to rotate.

The expanded heat exchange fluid can be output from the turboexpander and directed back into the Brayton cycle, and into heat exchangers of the liquefaction process to cool hydrogen (1110). The heat exchange fluid can then be directed back into the compressor (1102).

The rotation of the rotor of the turboexpander can result in the generation of electricity (1112). The electricity can be conditioned by power electronics so that it is compatible to supply power to one or more loads (1114), including one or more compressors of the Brayton cycle and/or the heat exchangers. The compressor(s) can be operated (at least partially) by the power generated by the turboexpander (1116).

In some embodiments, energy lost during expansion of the hydrogen during the liquefaction process can also be used to rotate a turbine wheel of a turboexpander to generate electricity. Likewise, such power can be used to operate various loads, including compressors of the heat exchangers or other devices.

The use of turboexpander 102 for generating electricity from gas expansion offers the following benefits in the liquefaction process:

1. Magnetic bearings allow for oil and air free operation eliminating process gas contamination
2. Magnetic bearings offer a long life (25 years), maintenance-free operation
3. System is designed to deliver 125 kW or 280 kW, a convenient and scalable power building block for liquefactions plants
4. Modular design allows for low capital costs instead of a custom-engineered solution
5. Flow-through design eliminates dynamic seals and risks of leaks
6. Energy balance due to generator loaded design Existing liquefaction plants process up to 40 tons per day (tpd) of liquid hydrogen, creating ~400 kW of potential power generation from the turboexpander 102. Future liquefaction plants are being designed with capacities up to 200 tpd, creating ~2 MW of clean power. Based on 2019 U.S. totals from the Energy Information Administration, 2 MW of power generation equates to 8,000 tons per year of $CO_2$ equivalent ($CO_2$e) emissions offset.

The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment. In the foregoing specification, a detailed description has been given with reference to specific exemplary embodiments. It will, however, be evident that various modifications and changes may be made thereto without departing from the broader spirit and scope of the disclosure as set forth in the claims.

What is claimed is:
1. An apparatus comprising:
    a three-phase permanent magnet synchronous electric generator comprising:
        a fluid inlet configured to receive hydrogen gas at a first pressure,
        a turbine wheel configured to expand the hydrogen gas and rotate in response to expansion of the hydrogen gas flowing into an inlet of the turbine wheel and out of the outlet of the turbine wheel,
        a rotor coupled to the turbine wheel and configured to rotate with the turbine wheel,
        a stationary stator, the three-phase permanent magnet synchronous electric generator to generate three-phase alternating current upon rotation of the rotor within the stator, and
        a fluid outlet configured to output the hydrogen gas at a second pressure less than the first pressure; and
    a power electronics system electrically connected to an electrical output of the three-phase permanent magnet synchronous electric generator and to receive three-phase alternating current from the three-phase permanent magnet synchronous electric generator.

2. The apparatus of claim 1, wherein fluid outlet is coupled to a fuel cell inlet of a fuel cell, and the fluid outlet configured to direct the hydrogen gas at the second pressure to the fuel cell.

3. The apparatus of claim 1, wherein the power electronics is electrically coupled to the fuel cell, and wherein the power electronics is configured to condition the three-phase alternating current to have a frequency and amplitude compatible to power the fuel cell.

4. The apparatus of claim 1, wherein fluid outlet is coupled to a gas turbine inlet of a gas turbine, and the fluid outlet configured to direct the hydrogen gas at the second pressure to the gas turbine.

5. The apparatus of claim 1, wherein:
the fluid inlet is configured to receive hydrogen gas at the first pressure from a trailer container; and
the fluid outlet is configured to output hydrogen gas at the second pressure to a compressor of a hydrogen gas storage facility.

6. The apparatus of claim 5, wherein the power electronics is electrically coupled to the compressor, and wherein the power electronics is configured to condition the three-phase alternating current to have a frequency and amplitude compatible to power the compressor.

7. The apparatus of claim 1, wherein:
the fluid inlet is configured to receive cooled heat exchange fluid at the first pressure from a first heat exchanger device hydrogen liquefaction system; and
the fluid outlet is configured to output expanded heat exchange fluid at the second pressure to a second heat exchanger of the hydrogen liquefaction system.

8. The apparatus of claim 7, wherein the power electronics is electrically coupled to one or more compressors of the first or second heat exchanger, and wherein the power electronics is configured to condition the alternating current to have a frequency and amplitude compatible to power the one or more compressors.

9. The apparatus of claim 7, wherein the power electronics is electrically coupled to one or more compressors of a pre-cooling heat exchanger of the liquefaction system, and wherein the power electronics is configured to condition the three-phase alternating current to have a frequency and amplitude compatible to power the one or more compressors.

10. The apparatus of claim 1, wherein the power electronics comprises a variable speed drive connected to the electrical output of the three-phase permanent magnet synchronous electric generator, the variable speed drive to convert the three-phase alternating current received from the three-phase permanent magnet synchronous electric generator into three-phase alternating current compatible with a power grid.

11. The apparatus of claim 10, wherein the variable speed drive comprises:
a rectifier to receive three-phase alternating current from the three-phase permanent magnet synchronous electric generator and convert the three-phase alternating current into direct current; and
an inverter to receive direct current from the rectifier and convert the direct current into an alternating current comprising an amplitude and frequency compatible with the power grid.

12. The apparatus of claim 1, wherein the electric generator comprises a three-phase electrical output, and wherein the brake resistor assembly comprises a brake resistor in series with each phase of the electrical output.

13. A method comprising:
receiving hydrogen gas at a first pressure into a turbine wheel of a three-phase permanent magnet synchronous electric generator, the hydrogen gas being received at a first pressure into the turbine wheel causing the turbine wheel to rotate and causing the hydrogen gas to expand;
causing a rotor to rotate within a stator of the electric generator by rotation of the turbine wheel;
generating three-phase electrical current by the three-phase permanent magnet synchronous electric generator by rotation of the rotor within the stator;
directing three-phase electrical current generated by the three-phase permanent magnet synchronous electric generator to a power electronics; and
outputting hydrogen gas at a second pressure, the second pressure less than the first pressure.

14. The method of claim 13, further comprising outputting the hydrogen gas at the second pressure to a fuel cell.

15. The method of claim 13, further comprising conditioning, by the power electronics, the electrical current to be compatible with powering the fuel cell; and directing the conditioned electrical current to the fuel cell.

16. The method of claim 13, further comprising:
receiving the hydrogen gas at the first pressure from a trailer container; and
outputting the hydrogen gas at the second pressure to a compressor at a hydrogen gas storage facility.

17. The method of claim 16, further comprising conditioning, by the power electronics, the electrical current to be compatible with powering the compressor.

18. The method of claim 13, further comprising:
receiving cooled heat exchanger fluid at the first pressure from a first heat exchanger of a hydrogen liquefaction system; and
outputting expanded heat exchanger fluid at the second pressure to a second heat exchanger the hydrogen liquefaction system.

19. The method of claim 18, further comprising conditioning, using power electronics, the electrical current to have a frequency and amplitude compatible to power one or more compressors of the hydrogen liquefaction system.

* * * * *